(12) United States Patent
Li et al.

(10) Patent No.: US 11,177,544 B2
(45) Date of Patent: Nov. 16, 2021

(54) BATTERY DEVICE

(71) Applicant: DONGGUAN POWERAMP TECHNOLOGY LIMITED, Guangdong (CN)

(72) Inventors: Changjiang Li, Ningde (CN); Changjian Shao, Ningde (CN)

(73) Assignee: DONGGUAN POWERAMP TECHNOLOGY LIMITED, Guangdong (CN)

( * ) Notice: Subject to any disclaimer, the term of this patent is extended or adjusted under 35 U.S.C. 154(b) by 0 days.

(21) Appl. No.: 16/202,807

(22) Filed: Nov. 28, 2018

(65) Prior Publication Data

US 2020/0028146 A1 Jan. 23, 2020

(30) Foreign Application Priority Data

Jul. 19, 2018 (CN) .......................... 201810796584.6

(51) Int. Cl.
*H01M 50/578* (2021.01)
*H01M 50/172* (2021.01)
*H01M 50/531* (2021.01)

(52) U.S. Cl.
CPC ....... *H01M 50/578* (2021.01); *H01M 50/172* (2021.01); *H01M 50/531* (2021.01)

(58) Field of Classification Search
CPC .......... H01M 2/30; H01M 2/345; H01M 2/06; H01M 50/578; H01M 50/531; H01M 50/172
See application file for complete search history.

(56) References Cited

U.S. PATENT DOCUMENTS

| 2012/0015240 A1* | 1/2012 | Baek ...................... H01M 2/021 429/178 |
| 2012/0100761 A1* | 4/2012 | Gro e et al. ............ H01M 2/22 439/774 |
| 2013/0029189 A1* | 1/2013 | Kim .................... H01M 50/543 429/61 |

* cited by examiner

*Primary Examiner* — Olatunji A Godo
(74) *Attorney, Agent, or Firm* — Westerman, Hattori, Daniels & Adrian, LLP

(57) ABSTRACT

A battery device includes a case, a cell disposed within the case, and first and second conductive tabs each electrically connected to the cell and partly enclosed by the case. The first conductive tab has an elastic portion exposed from the case and compressible or stretchable when a force is applied thereto. By having the elastic portions that are elastically deformable, the effects of push or pull resulting from the swelling of the cell and case on the conductive tabs may be reduced. Consequently, damages or breakages of the conductive tabs can be avoided and the safety of battery device may be improved.

10 Claims, 9 Drawing Sheets

BATTERY DEVICE

CROSS-REFERENCE TO RELATED APPLICATION

This application claims priority of Chinese Invention Patent Application No. 201810796584.6, filed on Jul. 19, 2018.

FIELD

The disclosure relates to a battery device, and more particularly to a battery device having elastic conductive tabs.

BACKGROUND

A conventional soft package lithium battery includes a cell, a first conductive tab and a second conductive tab. One end of each conductive tab is electrically connected to the cell, and the other end is electrically connected to a corresponding copper busbar by soldering. During discharge and charge, the soft package lithium battery may expand and deform such that a pulling force may be exerted on the conductive tabs and pull them away from the copper busbars. As a result, the conductive tabs may easily be damaged or even snap, which further results in safety issues such as short-circuit or leakage.

SUMMARY

Therefore, the object of the disclosure is to provide a battery device that can alleviate at least one of the drawbacks of the prior art.

According to an aspect of the present disclosure, the battery device includes a case, a cell disposed within the case, and a first conductive tab electrically connected to the cell and partly enclosed by the case. The first conductive tab has an elastic portion that is exposed from the case and that is elastically deformable when a force is applied thereto.

According to another aspect of the present disclosure, the battery device includes a cell, and a first conductive tab electrically connected to the cell. The first conductive tab has an elastic portion that is elastically deformable when a force is applied thereto.

The advantages of the present disclosure lie in that, by having the elastic portions that are elastically deformable, the effects of push or pull resulting from the swelling of the cell and case on the conductive tabs may be reduced. Consequently, damages or breakages of the conductive tabs may be avoided, and the safety of the battery device may be improved. If the elastic portions are disposed within the case, force will be mainly concentrated at connecting points between the conductive tabs and the electrodes when the cell and case swell. On the other hand, when the elastic portions are disposed out of the case and the conductive tabs are fixed on the case, force will instead be mainly concentrated at the elastic portions when the cell and case swell. Since the physical strength of the conductive tabs is stronger than that of the connecting points between the conductive tabs and the electrodes, the design of the present disclosure is able to prevent the conductive tabs from being separated from the electrodes and from being damaged or cracked. As a result, the safety of battery device may be improved.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
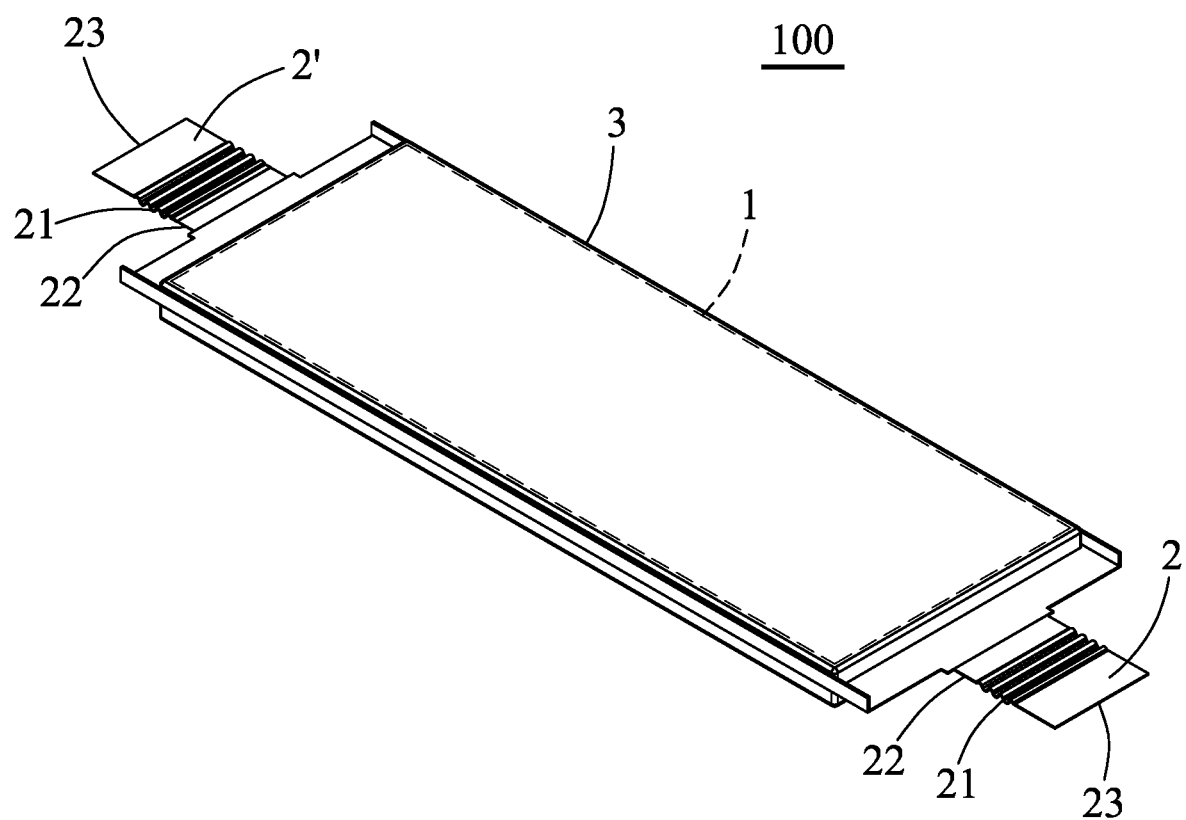
FIG. 1 is a perspective view of a first embodiment of a battery device according to the disclosure.

Before the present invention is described in greater detail, it should be noted that where considered appropriate, reference numerals or terminal portions of reference numerals have been repeated among the figures to indicate corresponding or analogous elements, which may optionally have similar characteristics.

As shown in FIG. 1, the first embodiment of a battery device 100 according to the disclosure is a soft package lithium battery, which includes a cell 1, first and second conductive tabs 2, 2', and a case 3.

Figure 2:
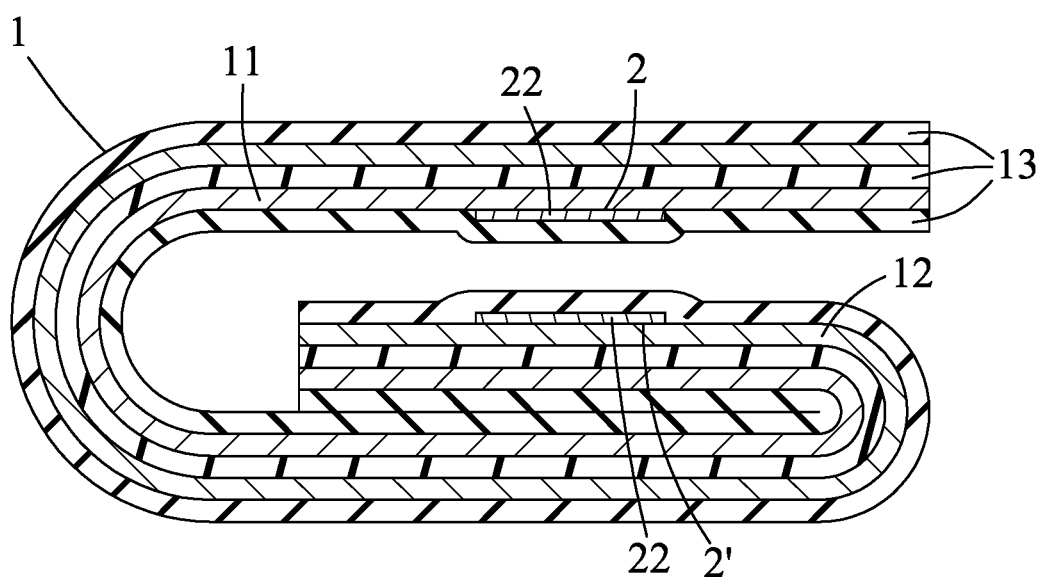
FIG. 2 is a sectional view of the first embodiment, illustrating relationship between a cell and two conductive tabs.
Figure 3:
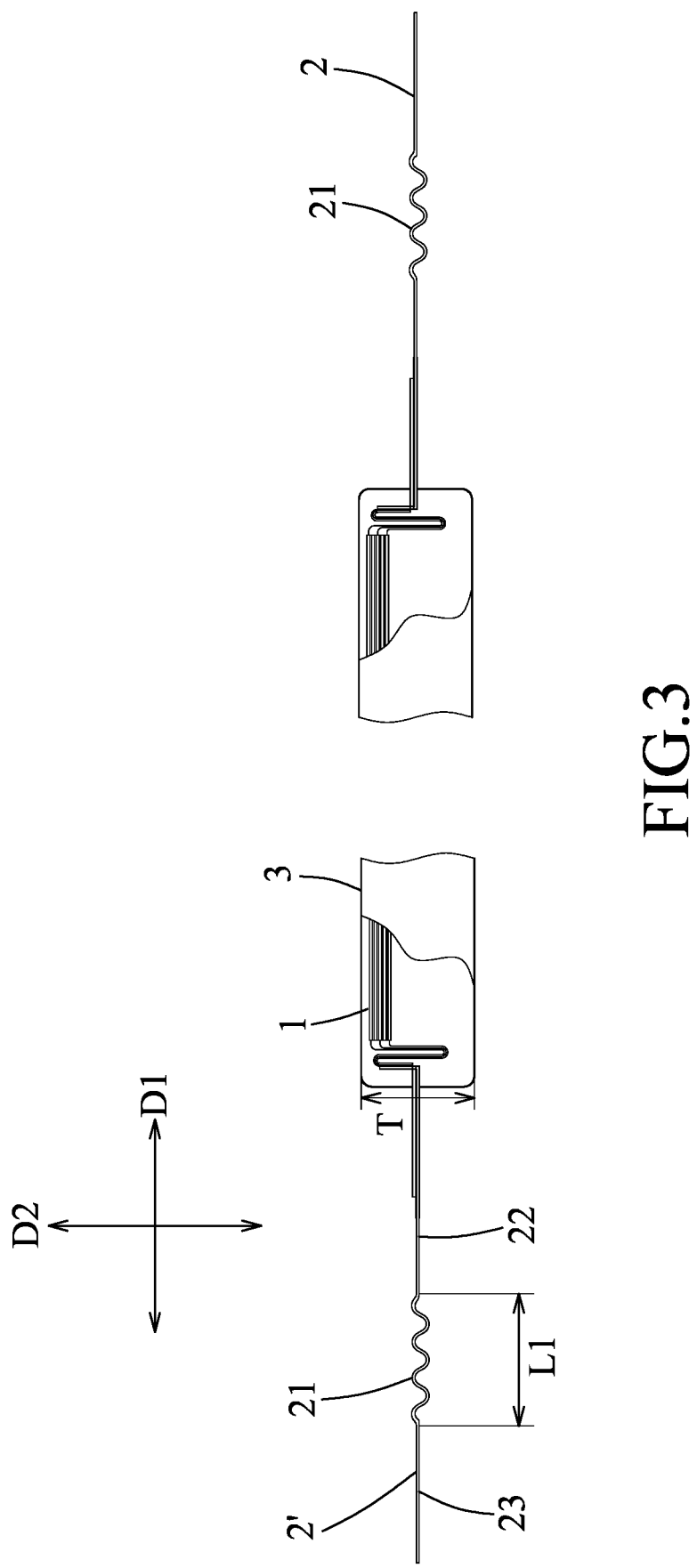
FIG. 3 is a partly and fragmentary sectional view of the first embodiment, illustrating two elastic portions of the conductive tabs in an un-stretched state.

As shown in FIGS. 1, 2 and 3, the cell 1 is disposed within the case 3 and includes a positive electrode 11, a negative electrode 12, and a plurality of separators 13. The positive electrode 11 is an aluminum cathode current collector coated with lithium iron phosphate (LFP) evenly on both sides thereof. The negative electrode 12 is a copper anode current collector coated with a graphite material evenly on both sides thereof. The separators 13 are made of an insulation material. In this embodiment, the quantity of the separators 13 is three. The first one of the separators 13 is disposed between the positive electrode 11 and the negative electrode 12 for separating the positive and negative electrodes 11, 12. The second one of the separators 13 is disposed on an outer surface of the positive electrode 11 oppositely of the negative electrode 12, and the third one of the separators 13 is disposed on an outer surface of the negative electrode 12 oppositely of the positive electrode 11. The laminated positive and negative electrodes 11, 12 and the separators 13 are then wound into a coiled cell 1 shown in FIG. 2. However, it should be noted that the laminated positive and negative electrodes 11, 12 and the separators 13 may also be kept flat as a stacked-structure, without folding or winding.

In this embodiment, the first and second conductive tabs 2, 2' have the shape of rectangular thin plates, and are made of metals having high electrical conductivity. The first and second conductive tabs 2, 2' are electrically connected to the positive and negative electrodes 11, 12 of the cell 1, respectively, and is partly enclosed by the case 3, that is, the first and second conductive tabs 2, 2' are partly exposed from the case 3. Each of the first and second conductive tabs 2, 2' has an elastic portion 21, and first and second connecting portions 22, 23 respectively connected to opposite ends of the elastic portion 21. The first connecting portion 22 of the first conductive tab 2 is electrically connected to the positive electrode 12 of the cell 1 by, for instance, soldering, and is partly enclosed by the case 3. The first conductive tab 2 is also referred to as a positive tab. The first connecting portion 22 of the second conductive tab 2' is electrically connected to the negative electrode 12 of the cell 1 by, for instance, soldering, and is partly enclosed by said case. The second conductive tab 2' iG also referred to as a negative tab. The elastic portions 21 of the first and second conductive tab 2, 2' are disposed outside of the case 3. The second connecting portions 23 of the first and second conductive tabs 2, 2' are connected to an external power supply or other conductive component such as copper busbars by, for instance, soldering, enabling the battery device 100 to be charged and discharged via the first and second conductive tabs 2, 2'. In the first embodiment of the disclosure, the first conductive tab 2 and the second conductive tab 2' extend from different sides of the case 3. Accordingly, the first connecting portions 22 are partly exposed from different sides of the case 3. The elastic portions 21 are elastically deformable when a force is applied thereto. In at least one embodiment, the elastic portions 21 are compressible or stretchable along a deformation direction (D1) when a force is applied thereto.

Figure 5:
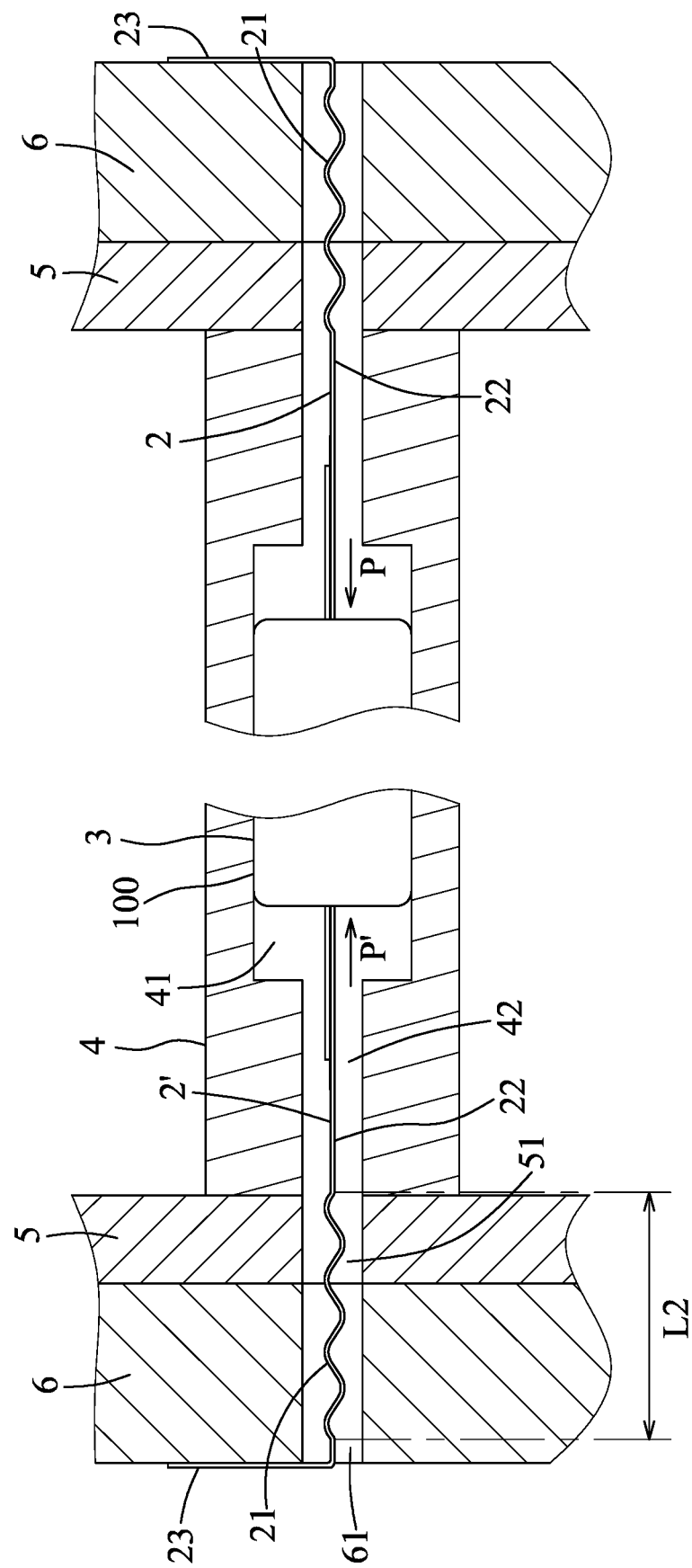
FIG. 5 is a fragmentary sectional view similar to FIG. 4, illustrating the conductive tabs being pulled by forces which cause extension of the elastic portions.

As shown in FIG. 3, each of the elastic portions 21 has an un-stretched length (L1) in the deformation direction (D1) when it is in its initial state. When each of the elastic portions 21 is compressed by a force, the length of the elastic portion 21 becomes smaller than the un-stretched length (L1); when each of the elastic portions 21 is stretched by a force, the length of the elastic portion 21 becomes greater than the un-stretched length (L1). When each of the elastic portions 21 is stretched to its maximum extension, it has a maximum stretched length (L2) (as shown in FIG. 5) in the deformation direction (D1), i.e. a fully extended length of each of the elastic portions 21. In this way, the first and second conductive tabs 2, 2' may be compressed or stretched via their elastic portions 21 when they experience push or pull. The elastic portions 21 are formed by compression bending the first and second conductive tabs 2, 2'. The elastic portions 21 are formed to have a wave like shape, e.g. a sinusoidal shape, along the deformation direction D1.

As shown in FIG. 3, the battery device 100 has a thickness (T) along a thickness direction (D2), which extends perpendicular to the deformation direction (D1). The maximum stretched length (L2) is greater than 10% of the thickness (T) of the battery device 100 and smaller than 15% of the thickness (T) of the battery device 100. For example, if the thickness (T) of the battery device 100 is 16 mm, the maximum stretched length (L2) of each of the elastic portion 21 will be greater than 1.6 mm and smaller than 2.4 mm.

When each of the elastic portions 21 is in the initial state (i.e., no force applied thereto), the un-stretched length (L1) is greater than or equal to 10% of a length of the first or second conductive tab 2, 2' in the deformation direction (D1).

When each of the elastic portions 21 is in the initial state (i.e., no force applied thereto), the elastic portion 21 has a thickness in the thickness direction (D2) ranging from 20% to 100% of the thickness (T) of the battery device 100.

It should be noted that, in another embodiment, the waveform of the elastic portion 21 may also be a square wave, a triangle wave, or a sawtooth wave. In addition, the first and second conductive tabs 2, 2' may be disposed at and exposed from the same side of the case 3.

The case 3 is a soft package formed by a metal-plastic composite film, such as an aluminum-plastic composite film. The case 3 encloses the cell 1 and parts of the first connecting portions 22 of the first and second conductive tabs 2, 2'. The rest of the first connecting portions 22 that are connected to the elastic portions 21 of the first and second conductive tabs 2, 2', the elastic portions 21, and the second connecting portions 23 of the first and second conductive tabs 2, 2' are exposed from the case 3. In addition, the case 3 is filled with an electrolyte (not shown) before the case 3 has been sealed.

The following are descriptions in regard to the application of the battery device 100.

Figure 4:
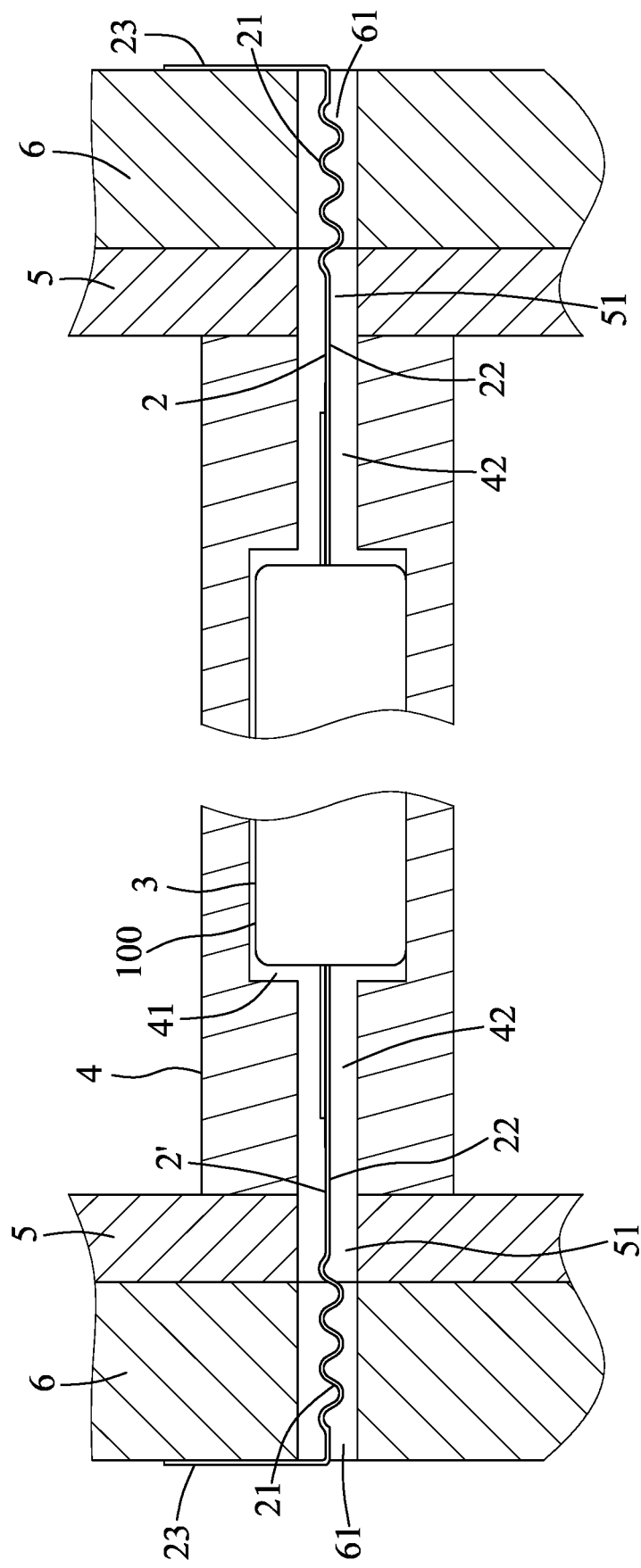
FIG. 4 is a fragmentary sectional view illustrating the assembly relationship among the conductive tabs of the first embodiment, copper busbar supports, and copper busbars, as well as illustrating the elastic portions of the conductive tabs in the un-stretched state.

As shown in FIG. 4, first, the battery device 100 is disposed in a receiving space 41 of a battery holder 4, with the first and second conductive tabs 2, 2' extending through two openings 42 of the battery holder 4, respectively, such that the elastic portions 21 and the second connecting portions 23 of the first and second conductive tabs 2, 2' are exposed from the battery holder 4. Next, the second connecting section 23 and the elastic portion 21 of each of the first and second conductive tabs 2, 2' first pass through a through hole 51 of a respective one of two copper busbar supports 5, and then through a through hole 61 of a respective one of the two copper busbars 6, such that the second connecting sections 23 of the first and second conductive tabs 2, 2' are exposed from the copper busbars 6, respectively. Finally, the second connecting sections 23 of the first and second conductive tabs 2, 2' are bent and each connected to the respective one of the copper busbars 6 by soldering.

As shown in FIGS. 4 and 5, the cell 1 and the case 3 may swell and deform during the process of charging or discharging via the first and second conductive tabs 2, 2' of the battery device 100. When the cell 1 and the case 3 swell and deform, the thickness (T) increases, resulting in two pulling forces P, P' pulling the first connecting sections 22 of the first and second conductive tabs 2, 2'. Since the second connecting sections 23 of the first and second conductive tabs 2, 2' are soldered to the corresponding copper busbars 6 and remain stationary, when the first connecting sections 22 of the first and second conductive tabs 2, 2' are pulled by the two pulling forces P, P', the first connecting sections 22 transfer the forces to the elastic portions 21, causing deformation of the elastic portions 21. Deformation of the elastic portions 21 caused by the pulling forces P, P' would reduces the effects of the pulling forces P, P' on the second connecting sections 23. Other than the aforementioned pulling forces P, P', alternatively, the swelling and deformation of the cell 1 may exert compression forces on the first and second conductive tabs 2, 2'. With the elastic portions 21 that may be compressed under compression forces, the effects of the compression forces on the first and second conductive tabs 2, 2' are greatly reduced. Consequently, damages or breakages of the first and second conductive tabs 2, 2' may be avoided, and the safety of battery use may be improved.

The expansion rate of the battery device 100 varies depending on the age thereof. The battery device 100 may stretch the elastic portions 21 of the first and second conductive tabs 2, 2', which leads to a change in the length of the elastic portion 21 between the un-stretched length (L1) and the maximum stretched length L2 in accordance with the expansion rate.

It should be noted that, in other examples of the present embodiment, the elastic portion 21 may be formed on only one of the first or second conductive tab 2, 2', and the effects of pulling forces P, P' or compression forces on the first and second conductive tabs 2, 2' can still be reduced. In addition, although the present embodiment only have one first conductive tab 2 and one second conductive tab 2', in other embodiments, a plurality of the first conductive tabs 2 may be provided and stacked together, and/or a plurality of the second conductive tabs 2' may be provided and stacked together. In such cases, efficient charging or discharging effect may be achieved.

Figure 6:
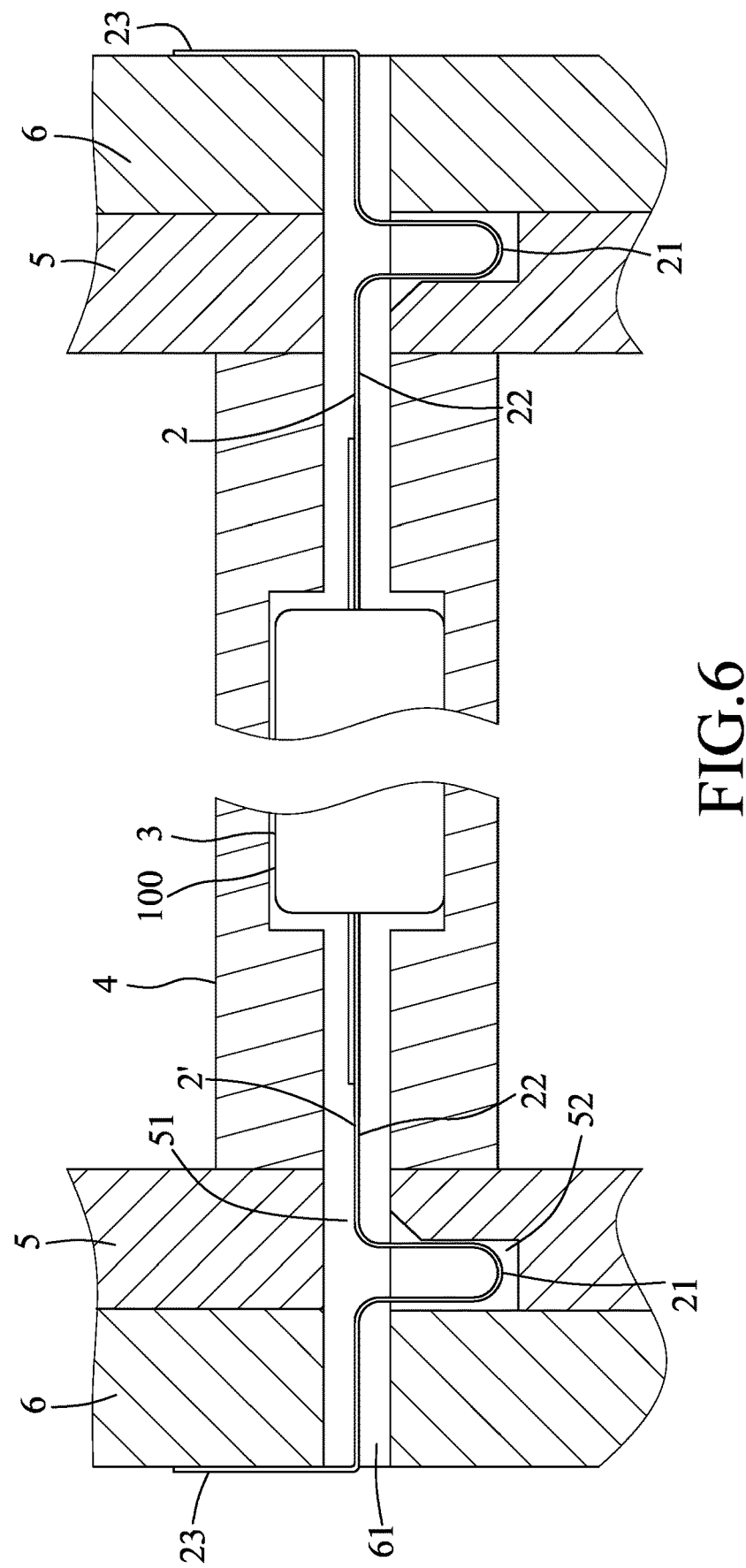
FIG. 6 is a fragmentary sectional view illustrating the assembly relationship among a second embodiment of a battery device, two copper busbar supports, and two copper busbars, as well as illustrating two U-shaped elastic portions.

As shown in FIG. 6, the second embodiment of a battery device 100 has a structure similar to that of the first embodiment. The main difference between this embodiment and the previous embodiment resides in the shapes of the elastic portions 21.

In the second embodiment, the elastic portions 21 of the first and second conductive tabs 2, 2' are in the shape of the letter "U". FIG. 6 shows one type of the elastic portions 21 with the open end of the U-shape of each of the elastic portions 21 facing up. A groove 52 is formed in each of the copper busbar supports 5 for housing a respective one of the elastic portions 21 and is in spatial communication with the through hole 51 in the copper busbar support 5. The elastic portions 21 deform when two pulling forces P, P' are applied to the first and second conductive tabs 2, 2', reducing the adverse effect of the pulling forces P, P' on the first and second conductive tabs 2, 2'.

Figure 7:
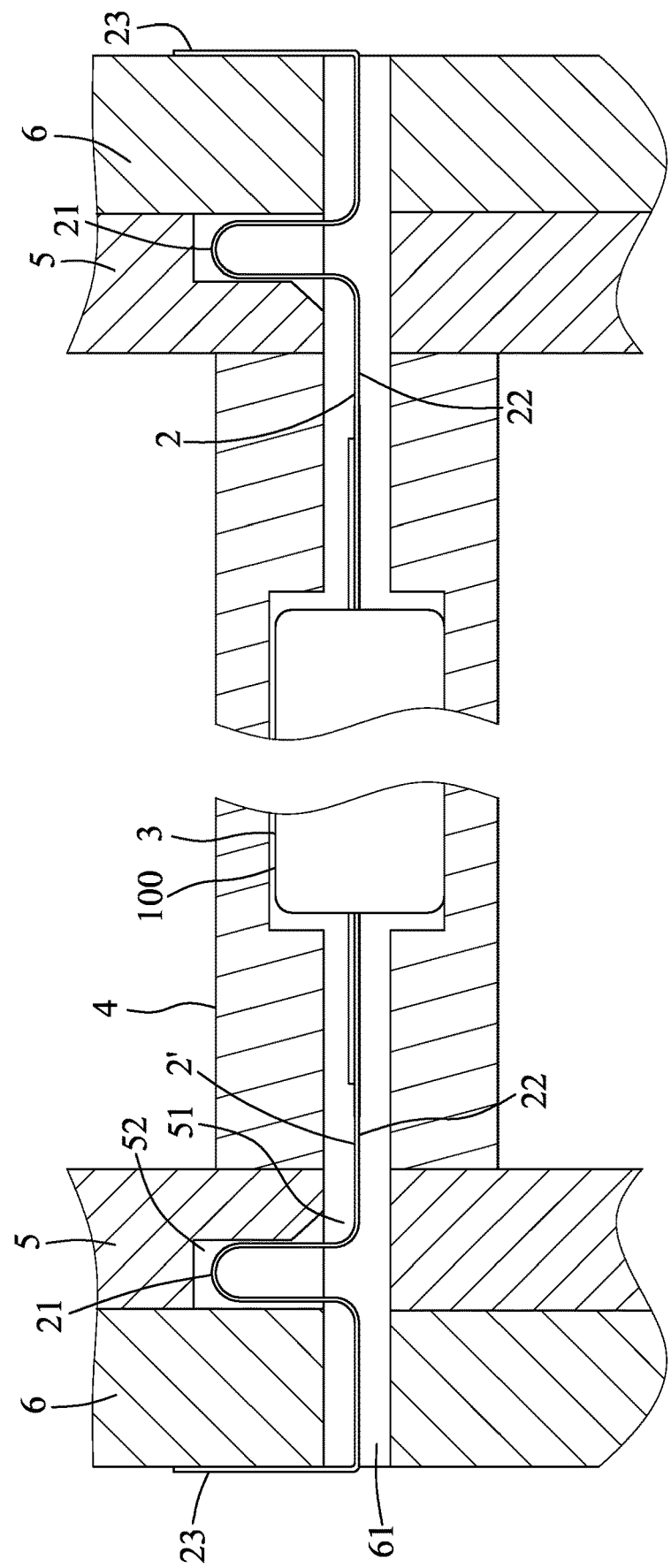
FIG. 7 is a fragmentary sectional view showing a modification of the second embodiment.

FIG. 7 shows a modification of the second embodiment of the elastic portions 21 with the open end of the U-shape of each of the elastic portions 21 facing down. In this modification, the groove 52 corresponds in position to a respective one of the elastic portions 21 for housing the respective elastic portion 21.

Figure 8:
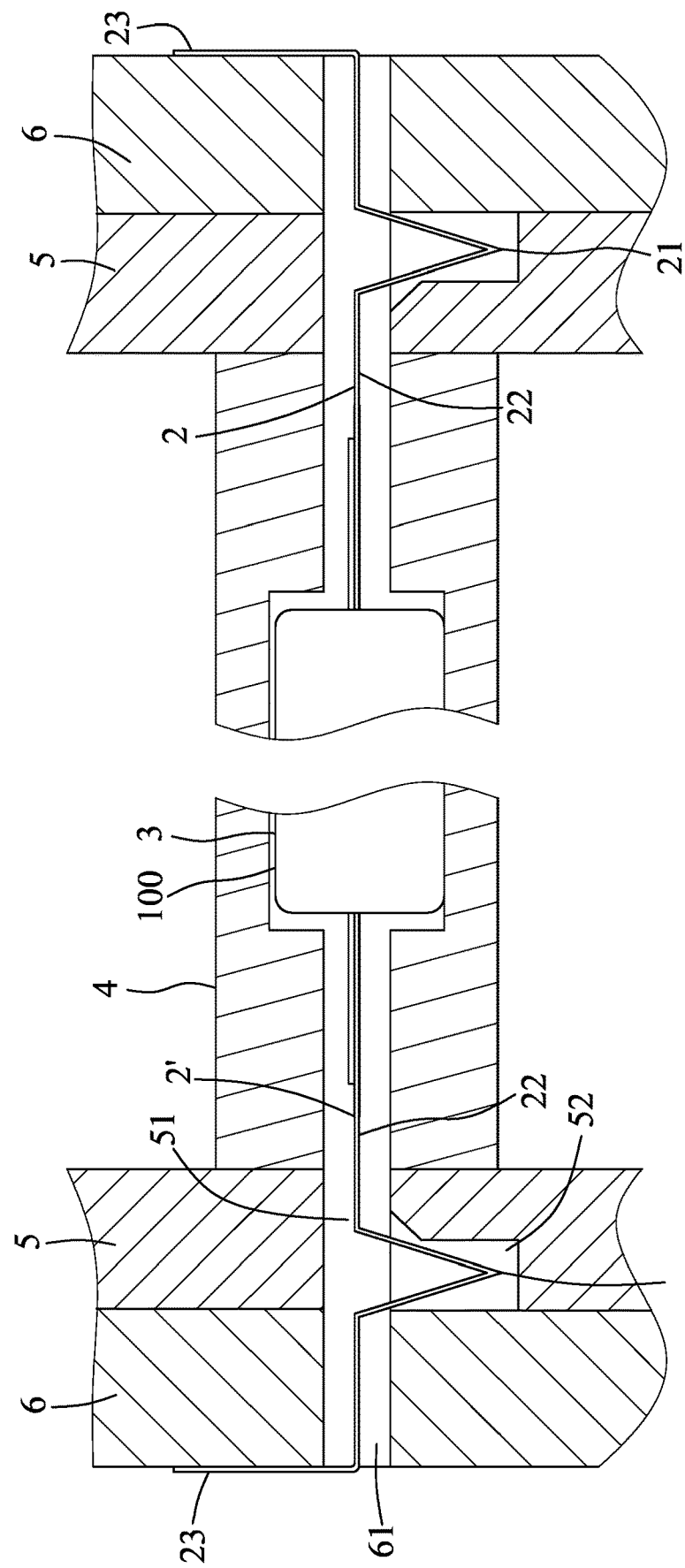
FIG. 8 is a fragmentary sectional view illustrating the assembly relationship among a third embodiment of a battery device, two copper busbar supports, and two copper busbars, as well as illustrating two V-shaped elastic portions.

As shown in FIG. 8, the third embodiment of a battery device 100 has a structure similar to that of the second embodiment. The main difference between this embodiment and the second embodiment resides in the shapes of the elastic portions 21.

In the third embodiment, the elastic portions 21 of the first and second conductive tabs 2, 2' are in the shape of the letter "V". FIG. 8 shows one type of the elastic portions 21 with the open end of the V-shape of each of the elastic portions 21 facing up. The elastic portions 21 deform when two pulling forces P, P' are applied to the first and second conductive tabs 2, 2', reducing the adverse effect of the pulling forces P, P' on the first and second conductive tabs 2, 2'. It should be noted that, similar to the embodiment shown in FIG. 7, the open end of the V-shape of each of the elastic portions 21 may face down in this embodiment.

Figure 9:
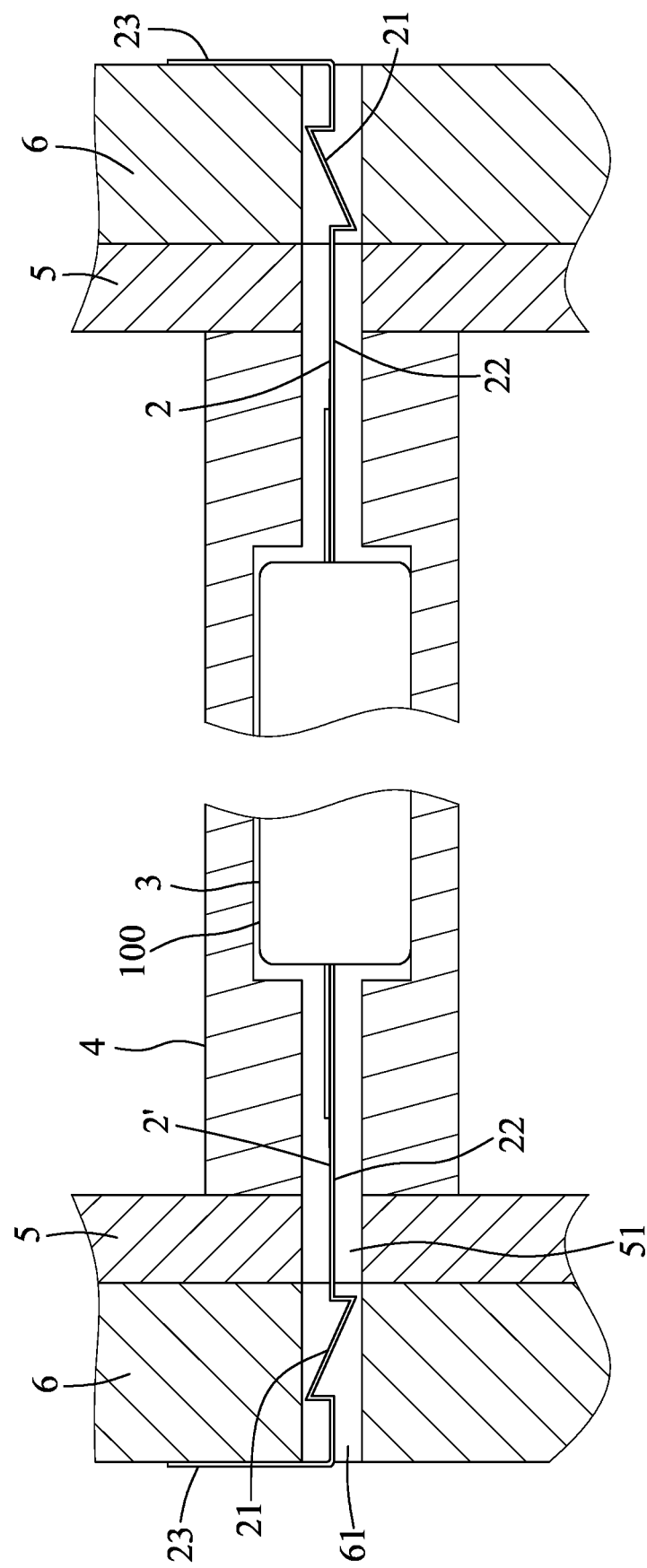
FIG. 9 is a fragmentary sectional view illustrating the assembly relationship among a fourth embodiment of a battery device, two copper busbar supports, and two copper busbars, as well as illustrating two N-shaped elastic portions.

As shown in FIG. 9, the fourth embodiment of a battery device 100 has a structure similar to that of the first embodiment. The main difference between this embodiment and the first embodiment resides in the shapes of the elastic portions 21.

In the fourth embodiment, the elastic portions 21 of the first and second conductive tabs 2, 2' are in the shape of the letter "N". In this shape, the elastic portions 21 deform when two pulling forces P, P' are applied to the first and second conductive tabs 2, 2' so as to reduce the adverse effect of the pulling forces P, P' on the first and second conductive tabs 2, 2'.

In summary, according to the abovementioned embodiments of the battery device 100, by having the elastic portions 21 that are compressible and stretchable when forces are applied thereto, the effects of push or pull resulting from the swelling of the cell 1 and the case 3 on the first and second conductive tabs 2, 2' may be reduced. If the elastic portions 21 are disposed within the case 3, force will be mainly concentrated at connecting points between the first and second conductive tabs 2, 2' and the electrodes when the cell 1 and the case 3 swell. On the other hand, when the elastic portions 21 are disposed out of the case 3 and the first and second conductive tabs 2, 2' are fixed on the case 3, as in the design of the present disclosure, force will instead be mainly concentrated at the elastic portions when the cell 1 and the case 3 swell. Since the physical strength of the first and second conductive tabs 2, 2' is stronger than that of the connecting points between the first and second conductive tabs 2, 2' and the corresponding electrodes, the design of the present disclosure is able to prevent the first and second conductive tabs 2, 2' from being separated from the corresponding electrodes and from being damaged or cracked. As a result, the safety of battery device may be improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A battery device, comprising: a case;
a cell disposed within said case; and
a first conductive tab integrally formed as one piece;
wherein said first conductive tab has a first connection portion, an elastic portion, and a second connection portion, the first connection portion and the second connection portion are electrically connected to two opposite ends of the elastic portion, the first connection portion is directly and electrically connected within the case to said cell and partly sealed by said case, the elastic portion and the second connection portion are exposed from said case, and the elastic portion that is elastically deformable when a force is applied thereto.

2. The battery device as claimed in claim 1, wherein said elastic portion is formed to have a wave shape, a U-shape, a V-shape, or an N-shape.

3. The battery device as claimed in claim 1, wherein said second connecting portion is adapted to be connected to a conductive component.

4. The battery device as claimed in claim 1, wherein said first conductive tab is adapted to be connected to a conductive component.

5. The battery device as claimed in claim 1, wherein said battery device comprises a plurality of first conductive tabs which are stacked together.

6. The battery device as claimed in claim 1, wherein said elastic portion has a maximum stretched length, which is greater than 10% of a thickness of said battery device and smaller than 15% of the thickness of said battery device.

7. The battery device as claimed in claim 1, wherein said elastic portion has an un-stretched length which is greater than or equal to 10% of a length of said first conductive tab.

8. The battery device as claimed in claim 1, wherein said elastic portion has a thickness, when no force is applied to said elastic portion, which ranges from 20% to 100% of a thickness of said battery device.

9. The battery device as claimed in claim 1 further comprising a second conductive tab, wherein said second conductive tab has an elastic portion that is exposed from said case, and that is elastically deformable when a force is applied thereto.

10. The battery device as claimed in claim 9, wherein said first conductive tab and said second conductive tab are exposed from different sides of said case.

* * * * *